Figure 1:
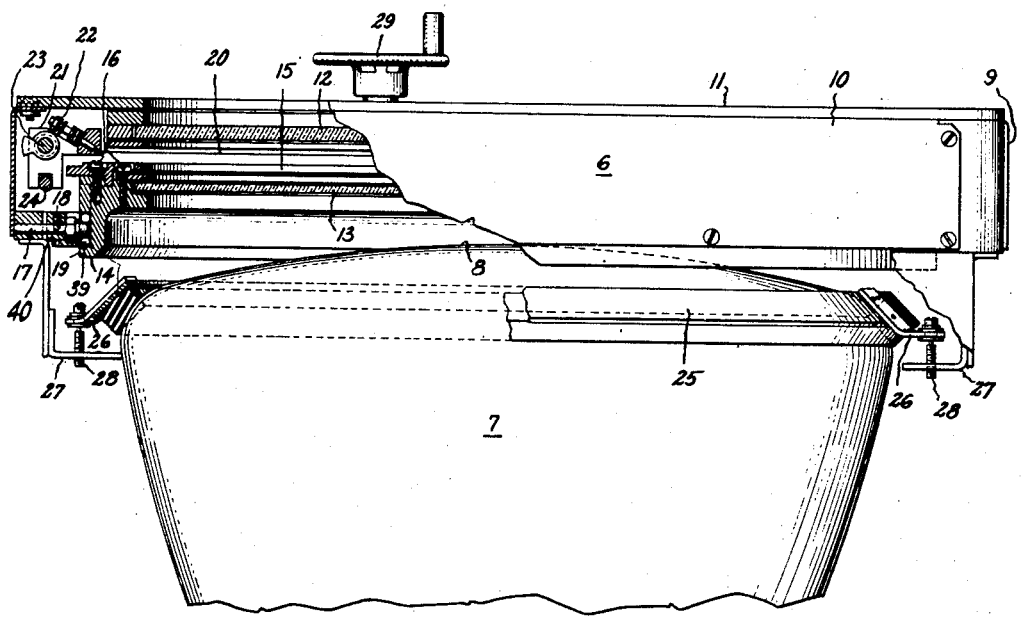

Inventor:
Richard J. Newman,
by Merton D Moore
His Attorney.

Dec. 25, 1951     R. J. NEWMAN     2,580,240
PLOTTING SYSTEM
Filed July 16, 1947     2 SHEETS—SHEET 2
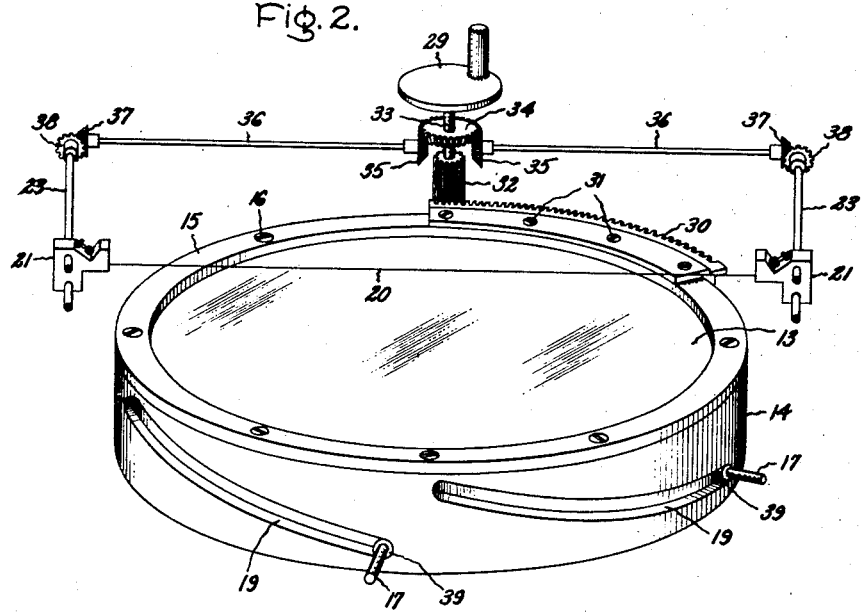
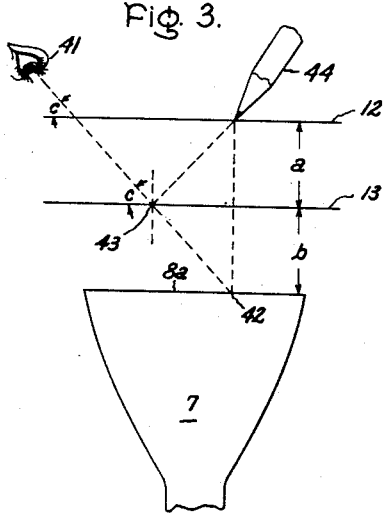
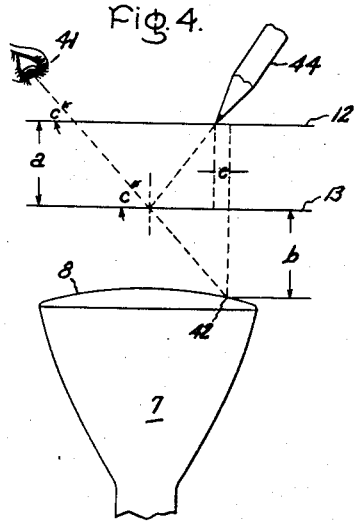
Inventor:
Richard J. Newman,
by Merton D. Moore
His Attorney.

Patented Dec. 25, 1951

2,580,240

UNITED STATES PATENT OFFICE 2,580,240

PLOTTING SYSTEM

Richard J. Newman, Scotia, N. Y., assignor to General Electric Company, a corporation of New York Application July 16, 1947, Serial No. 761,278

2 Claims. (Cl. 88—74)

My invention relates to a plotting system and, more particularly, to a plotting system for plotting the images as seen upon a cathode ray tube.

In apparatus heretofore developed for plotting signals which are visible on a curved surface, such as images on the face of a cathode ray tube, on a flat transparent surface above the curved surface, it has heretofore been difficult to avoid errors, particularly those due to parallax. This has affected the accuracy of many radar, sonar, and other systems associated with such equipment where recorded information is required either for making permanent records or for making precise measurments.

It is an object of my invention to provide an improved plotting device whereby an accurate plot may be made of a signal image visible on the curved surface of a cathode ray tube or the like.

It is a further object of my invention to reduce the parallax error in such a plotting system to a minimum.

The features of my invention, which I believe to be novel, are set forth with particularity in the appended claims. My invention itself, however, together with further objects and advantages can best be understood by reference to the following description taken in conjunction with the accompanying drawings in which Fig. 1 is a composite side elevational view of the plotting device and cathode ray tube, with a portion in cross-section; Fig. 2 is a simplified perspective view of a portion of the plotting device; Figs. 3 and 4 are schematic diagrams which will be referred to in explaining the principles underlying the invention. Like parts are given the same reference numbers in the several figures.

Referring more particularly to Fig. 1, I have shown a fragmentary side elevational view of a conventional cathode ray tube 7 having a convex face or viewing screen 8. The plotting device 6 includes a suitable housing 9 which may have removable side panels 10. The face of tube 7 is positioned with respect to the plotting device 6 by a centering ring 25 which is attached to the housing 9 by means of brackets 26 and 27 and mounting screws 28. A cover 11 has an opening of approximately the same size as the screen 8 of the tube 7. Attached to the cover 11 in any suitable manner is a transparent screen 12 which may be of glass, Lucite, or other rigid transparent material. A semi-transparent mirror 13 is mounted parallel to screen 12 and below it in a carriage ring 14. Mirror 13 is secured by the clamping ring 15 which is attached to the carriage ring 14 by screws 16 or other suitable means. The carriage 14 is mounted in housing 9 by means of a plurality of pins 17, each of which is fitted into a radial socket in a ring 40 supported within housing 9. Each pin 17 is secured to ring 40 by means of a set screw 18. The projecting end of each pin 17 carries a ball bearing assembly 39. As is best shown in Fig. 2, the pins 17 are equally spaced around the circumference of carriage ring 14 and each of the bearing assemblies 39 is retained within one of a corresponding plurality of spiral slots 19 in carriage ring 14.

Mounted parallel to and above the surface of mirror 13 is an indicating wire 20. Wire 20 is stretched between a pair of blocks 21 and its tension may be adjusted by set screws 22. Each of the blocks 21 is threadedly mounted on one of a pair of horizontal, parallel, lead screws 23. The blocks 21 are held in position against rotary movement by means of a pair of guide rods 24 parallel to screws 23, each of which engages a groove in one of the blocks 21.

Simultaneous movement of carriage 14 and mirror 13 along a vertical axis and of indicating wire 20 in a horizontal plane is accomplished by means of the positioning mechanism now to be described.

A handwheel 29 controls both the movement of the carriage 14 and of the indicating wire 20 with respect to housing 9 and tube 7. In order to show the construction more clearly, Fig. 2 shows these elements and their associated operating mechanism with the housing 9 removed. A segmentary gear 30 is secured to the carriage 14 by suitable means, such as screws 31, and meshes with an elongated pinion gear 32 mounted on shaft 33 to which is attached the handwheel 29. As the carriage 14 is rotated, it always remains horizontal and its vertical travel is fixed by the pitch of the parallel spiral slots 19 as they travel on the ball bearing assemblies 39 carried by the pins 17. To control the movement of indicating wire 20, a bevel gear 34 is secured on the shaft 33, and meshes with two bevel gears 35 each of which is mounted on one end of a pair of axially aligned shafts 36. Shafts 36 are substantially parallel to the indicating wire 20 and are provided at their opposite ends with bevel gears 37 which mesh at a right angle with bevel gears 38 on the lead screws 23.

A clearer understanding of the principles underlying the invention may be had by referring to the schematic diagrams of Fig. 3 and Fig. 4. In Fig. 3, for illustration, I have shown the cathode ray tube 7 as having a flat face 8a. An operator, represented by an eye 41, sees a signal 42 visible on the tube face 8a at a point 43 on the mirror 13. A pencil 44 is moved along the surface of the plotting screen 12 until the reflection of the tip of the pencil 44 appears to coincide with the signal 42 at the point 43. When the tube face 8a is flat and parallel to the plotting screen 12 and the mirror 13 is located equidistant between them, the pencil 44 will be directly above the signal 42 when the reflection of the tip coincides with the image on the mirror, regardless of where it may appear on the tube face. At the mirror surface, the angle of incidence of light from the pencil point is equal to its angle of reflection. Since the surfaces are equally spaced, it is obvious that the reflection of the pencil point will appear to coincide with the image of the signal only when it is directly above the signal. This is true for any angle from which the operator might view the signal.

The majority of present cathode ray tubes have a slightly curved convex surface for mechanical strength, especially in the larger sizes. This surface usually approximates a segment of a sphere having a radius greater than the diameter of the cathode ray tube face. This curvature of the tube face introduces inaccuracies in plotting when the position of the mirror plotting screen and tube are fixed as illustrated in Fig. 4.

In Fig. 4 I have shown the cathode ray tube 7 as having a curved face 8. Inasmuch as the face 8 is curved, the mirror 13 cannot be in a fixed position and be equidistant between all points on the tube face 8 and the plotting screen 12. For illustration I have shown the mirror 13 equidistant from the high point of the curved face 8 and the plotting screen 12. As in Fig. 3 the operator 41 sees a signal 42 on the mirror. The pencil 44 is moved along the surface of the plotting screen 12 until the reflection of the pencil 44 appears to coincide with the signal 42. Instead of the pencil point 44 being directly above the signal, as in Fig. 3, it will be off of a true plot by the distance e due to the error of parallax. If used with a 20" diameter tube having a surface of 30" radius, the inaccuracy of plotting will be more than 1.5" at a point on the face 9" from the center.

An analysis of Fig. 4 shows that the error $e$ in plotting is equal to —

$$e = b \cot c - a \cot c$$

or $$e = (b-a) \cot c$$

where $e$ is the error, $a$ is the distance from the plotting screen 12 to the mirror 13 and $b$ is the distance from the mirror 13 to the signal 42, and $c$ is the angle of incidence of light from the pencil point which is also equal to the angle of reflection. From the equation, it follows that the error depends on the difference between $a$ and $b$ and not their absolute values. Also when $b = a$, the error is zero and the plot is correct. From this relation, it can be seen that in order to make an accurate plot, the distance $a$, should equal the distance $b$, every time a plot is made. This may be done by moving any of the three elements vertically to maintain this relation.

When the elements are in the proper relationship, the reflection of the pencil point appears to coincide with the image in the same plane. If the distance $a$ is less than $b$, the point will appear to be in a plane above the image, if $a$ is greater than $b$, it will appear to be in a plane below the image. Hence the operator can tell whether he has the device adjusted properly for any given signal and, if not, which direction to move it for proper adjustment.

In the illustrated embodiment, the semi-transparent mirror 13 is supported in the vertically movable carriage 14. The motion of the carriage 14 is controlled by the handwheel 29, as previously described. Also controlled by the handwheel 29 is the indicator 20 which moves across the plotting surface. The indicator 20 enables the operator to quickly bring the elements into the approximate proper adjustment, the final adjustment being made as previously described. In order to facilitate adjustments, it is desirable to have a series of concentric rings on the surface of the plotting screen 12. By setting the indicator line 20 so that it appears to be tangent to the ring nearest the signal 42, the mirror is correctly positioned for plotting on that ring. i. e., the distance from the portion of viewing screen 8 at which signal indication 42 appears to mirror 13 is equal to that between the mirror and plotting surfaces 12, leaving only a minor interpolating adjustment to bring it to its proper position for plotting at the exact radius of signal 42.

The pitch of the spiral slots is approximately ½ the radius of the tube face, which makes it simpler to follow the path of the signal along the face of the tube.

Plotting consists of viewing a signal, turning the handwheel until the indicator on the plotting surface as seen in the mirror appears to be at the same radius as the signal, then locating the pencil so that its reflection appears to coincide with the image and is in the same plane. As the signal changes, the mirror is readjusted for the curvature of the tube face.

Now that larger cathode ray tubes have been developed, the advantages of their use accentuate the need of obtaining true plots such as may be obtained by my invention. Heretofore such true plots could only be obtained with projection type units with costly optical systems.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A plotting system comprising a viewing screen in the form of a substantially spherical segment, a plane, transparent plotting surface spaced from said screen and perpendicular to a radial axis of said segment, a plane, semi-transparent mirror interposed between said screen and said surface in parallel relation with said surface, a displaceable carriage supporting one of said screen, said surface and said mirror for movement along said radial axis, an indicator, another displaceable carriage supporting said indicator for movement relative to said plotting surface in a plane parallel thereto and proximately spaced therefrom, and a control member coupled to each of said carriages for simultaneously displacing said carriages to align said indicator with the axial projection of a circle concentric with said radial axis and intercepting a selected portion of said viewing screen and to position said one of said screen, said surface and said mirror so that said mirror is equidistant from said surface and said portion of said viewing screen.

2. A plotting system comprising a viewing screen in the form of a substantially spherical segment, a plane, transparent plotting surface spaced from said screen and perpendicular to a radial axis of said segment, a plane, semi-transparent mirror interposed between said screen and said surface in parallel relation with said surface, a carriage member supporting one of said screen, said surface, and said mirror, mounted for movement along said radial axis and including a first cam surface, a carriage-actuating member including a second cam surface cooperating with said first cam surface to displace said carriage member along said axis in response to rotation of one of said members, an indicator, another displaceable carriage supporting said indicator for movement relative to said plotting surface in a plane parallel thereto and proximately spaced therefrom, a rotatable control member coupled to said one of said members, and a mechanical linkage coupled to said control member and to said other carriage for producing simultaneous displacement of said carriages to align said indicator with the axial projection of a circle concentric with said radial axis and intercepting a selected portion of said viewing screen and to position said one of said screen, said surface and said mirror so that said mirror is equi-distant from said surface and said portion of said viewing screen.

RICHARD J. NEWMAN.

REFERENCES CITED

The following references are of record in the file of this patent:

UNITED STATES PATENTS

| Number | Name | Date |
|---|---|---|
| 706,297 | De Bruyn | Aug. 5, 1902 |
| 2,215,310 | Zupanec | Sept. 17, 1940 |
| 2,251,984 | Cleaver et al. | Aug. 12, 1941 |
| 2,289,557 | Taylor | July 14, 1942 |
| 2,364,731 | Luck | Dec. 12, 1944 |